US006982560B2

(12) United States Patent
Pandya et al.

(10) Patent No.: US 6,982,560 B2
(45) Date of Patent: Jan. 3, 2006

(54) METHOD AND SYSTEM FOR DETERMINING CROSS-TALK EFFECTS

(75) Inventors: Harshang Pandya, Singapore (SG); Kanwaljeet Singh, Azalea Park (SG)

(73) Assignee: Agilent Technologies, Inc., Palo Alto, CA (US)

( * ) Notice: Subject to any disclaimer, the term of this patent is extended or adjusted under 35 U.S.C. 154(b) by 2 days.

(21) Appl. No.: 10/622,411

(22) Filed: Jul. 18, 2003

(65) Prior Publication Data

US 2005/0012508 A1    Jan. 20, 2005

(51) Int. Cl.
    *G01R 27/28* (2006.01)
(52) U.S. Cl. ...................................... 324/628; 324/674
(58) Field of Classification Search ................ 324/538, 324/539, 627, 628, 674; 702/79

See application file for complete search history.

(56) References Cited

U.S. PATENT DOCUMENTS

| 5,483,684 | A | * | 1/1996 | Ono et al. ............... 455/161.2 |
| 5,532,603 | A | | 7/1996 | Bottman |
| 5,821,760 | A | * | 10/1998 | Koeman et al. ............ 324/628 |
| 6,522,152 | B1 | | 2/2003 | Tonti et al. |
| 6,611,147 | B2 | * | 8/2003 | White et al. ................ 324/539 |
| 6,636,048 | B2 | * | 10/2003 | Sciacero et al. ............ 324/520 |
| 6,826,506 | B2 | * | 11/2004 | Adamian et al. ........... 702/118 |

* cited by examiner

*Primary Examiner*—Walter Benson

(57) ABSTRACT

According to an aspect of the invention, a method for determining near-end cross-talk effects is provided. A periodic test signal having a frequency increasing in predetermined steps is input into a conductor of a transmission cable. A raw cross-talk signal is received from another conductor of the transmission cable and the received cross-talk signal is processed in the frequency domain to determine a combination of near-end cross-talk components of the received cross-talk signal. The combination of near-end cross-talk components represents the characteristic of the near-end cross-talk effects.

18 Claims, 7 Drawing Sheets

METHOD AND SYSTEM FOR DETERMINING CROSS-TALK EFFECTS

BACKGROUND

This invention relates in general to determining cross-talk, and more particularly to determining and compensating near-end cross talk.

Personal computers, workstations and printers are common equipment in an office. This equipment is normally connected to one another in a Local Area Network (LAN) to allow communication of information. The physical connections in a LAN system are usually implemented using LAN cables containing copper conductors inside them. Typically, there are eight copper conductors in each LAN cable, with every two copper conductors forming a twisted pair (i.e. four twisted pairs). Data signals are transmitted in each twisted pair of copper conductors. Each LAN cable is terminated in a "RJ-45" connector, in compliance with industry standards.

Each twisted pair of conductors in the LAN cable functions as a separate communication channel. Therefore, data signals in one twisted pair of conductors should not interfere with or induce any signals in another twisted pair of conductors in the same LAN cable.

Various parameters, like attenuation, return loss and Near End Cross-talk (NEXT), can be used to characterize the performance and quality of LAN cables. Cross-talk is a measure of signal isolation between two twisted pairs of conductors in a LAN cable. In order for a LAN system to operate in an acceptable environment, cross-talk isolation in LAN cables should be maintained above a minimum level.

Telecommunication Industry Association (TIA), an industry working group, has defined a LAN channel configuration. The LAN channel configuration is described in the TIA standard 568-B or ISO 11802 $2^{nd}$ edition, which specify a minimum level of cross-talk isolation over a frequency range of 1 to 250 megahertz. In addition, the TIA and ISO further specify that the NEXT introduced by a RJ-45 connector, which is required to connect a test instrument to a cable under test in order to measure cross-talk, should be excluded from the cross-talk measurement in the LAN channel configuration.

Since a raw cross-talk signal has to be taken with the test instrument connected to the LAN channel configuration by an RJ-45 connector, the raw cross-talk signal includes cross-talk effects introduced by the near end RJ-45 connector. Furthermore, the cross-talk effects from the near end RJ-45 connector can be significantly large. Therefore, the raw cross-talk signal obtained by the test instrument has to be processed to compensate for or reduce the cross-talk effects contributed by the near end RJ-45 connector, in order for cross-talk measurements by the test instrument to be compliant with the TIA standard.

In a prior art method, the cross-talk characteristics of a near end RJ-45 connector is determined and a corresponding near-end cross-talk compensation model is produced. When the raw cross-talk signal is received, the compensation model is applied to the raw cross-talk signal, and a compensated near-end cross-talk signal is provided. However, such a heuristic compensation model is static and reflects the cross-talk characteristics of only a typical RJ-45 connector. The static model does not and cannot accurately model different types of RJ-45 connectors manufactured by different manufacturers. Differences between the static model and characteristics of an actual RJ-45 connector that is used with a test instrument can result in inaccuracies in the cross-talk measurement. Furthermore, the connection between the test instrument and the RJ-45 connector undergoes wear and tear due to repeated plugging and unplugging of the RJ-45 connector from the test instrument. This wear and tear can contribute to additional cross-talk effects, which are not compensated for by the static model, being introduced into the cross-talk measurement.

U.S. Pat. No. 5,532,603 teaches a dynamic method for near-end cross-talk compensation. The patent teaches injecting pulse signals of differing pulse widths into a twisted pair of conductors of a LAN cable, and measuring a raw cross-talk signal induced in another twisted pair of conductors. However, as the signals injected into the conductors are pulse signals, the instrument has to perform characterization in the time domain. Such time domain characterization tends to be susceptible to errors due to environmental effects. Furthermore, in order to ensure that cross-talk due to the near end RJ-45 connector is separable from the raw cross-talk signal, the width of the injected pulses should be small. However, a small pulse width results in a test signal of a low signal power, and this makes the induced cross-talk signal difficult to measure.

U.S. Pat. No. 6,522,152 discloses another method of determining and canceling NEXT contributions of a connector interface. The method includes sending a test signal through a channel and receiving a cross-talk signal or response corresponding to the test signal in the frequency domain. The frequency domain cross-talk signal is converted to a time domain cross-talk signal for further processing. Such further processing includes searching the time domain cross-talk signal for a connector response signature and determining an amplitude and a location of the connector response signature. Then an ideal frequency response corresponding to the connector response signature at the estimated amplitude and location is determined. Finally, the connector response signature is canceled with the ideal frequency response to remove NEXT contributions of the connector interface.

SUMMARY

According to a first embodiment of the invention, a method for determining near-end cross-talk effects is provided. A test signal, in one embodiment a periodic test signal having a frequency increasing in predetermined steps, is input into a conductor of a transmission cable. A raw cross-talk signal is received from another conductor of the transmission cable and the received signal is processed in the frequency domain to determine a combination of near end cross-talk components that represent the characteristic of the near-end cross-talk effects.

According to another embodiment of the invention, there is provided a method for removing the near-end cross-talk effects from the raw cross-talk signal. The method determines the near-end cross-talk effects using the method described above, and subtracts the determined near-end cross-talk effects from the raw cross-talk signal.

According to yet another embodiment of the invention, there is provided a system for determining the near-end cross-talk effects originating from a near-end location of the system as described above.

BRIEF DESCRIPTION OF DRAWINGS

The invention will be better understood with reference to the drawings, in which.

DETAILED DESCRIPTION OF THE EMBODIMENTS

The embodiments of the invention dynamically provide near-end cross-talk compensated measurements by receiving a raw cross-talk signal, determining a near-end cross-talk signal from the raw cross-talk signal, and subtracting the near-end cross-talk signal from the raw-cross talk signal to produce the near-end cross-talk compensated measurement in accordance with the TIA standard.

Figure 1:
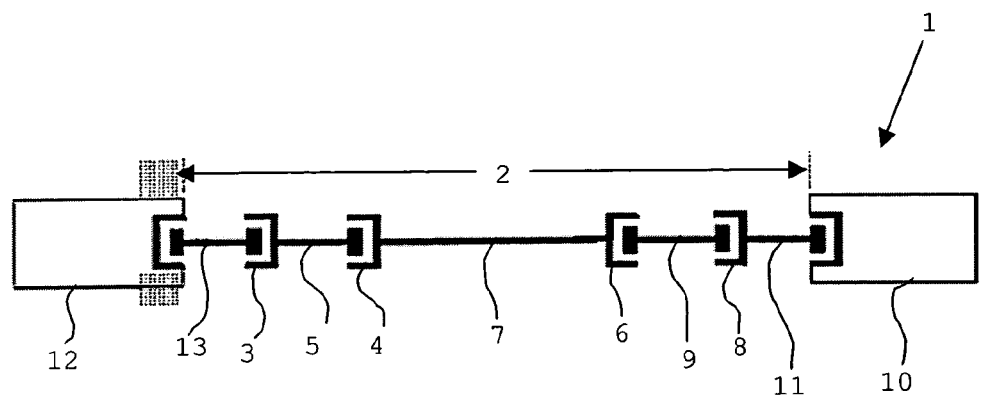
FIG. 1 is a drawing of a channel configuration of a cable channel for measuring cross-talk according to the TIA standard.

With reference to FIG. 1, a diagram of a channel configuration 1 according to the TIA standard is shown. The channel configuration 1 typically includes a telecommunication outlet 3, which is optionally connected to a transition or consolidation point connector 4 using a transition cable 5. The transition point connector 4, further connects to a horizontal cross-connect or interconnect 6 using a horizontal cable 7. The horizontal cross-connect 6 may connect to a further horizontal cross-connect 8 using a patch cord 9. The channel configuration 1 typically terminates in a telecommunication room where it is connected to equipment 10 using an equipment cord 11. A work area device 12, for example a computer, is connected to the equipment 10 via the telecommunication outlet 3 using a work area patch cord 13.

As mentioned, the transition or consolidation point connector 4 is optional. Therefore, the telecommunication outlet 3 may be connected directly to the horizontal cross-connect 6 using the horizontal cable 7.

In a typical test configuration, a test instrument (FIG. 2) is used to measure the cross-talk of the channel configuration 1 to determine if it complies with the TIA standard. To measure the cross-talk of the channel configuration 1, the test instrument replaces the work area device 12 and is connected to the telecommunication outlet 3 using a patch cord. To facilitate the testing of the connection through the channel configuration 1, the equipment 10 in the telecommunication room is replaced with a remote test unit (not shown) to provide a proper termination for test signals generated by the test instrument.

As the cross-talk is measured from the test instrument, the end of the channel configuration 1 terminating at the test instrument is referred as the near-end. In the same manner, the end of the channel configuration 1 terminating at the remote test unit is referred as the far-end.

The test instrument and the remote test unit each have an adapter to receive the plug of a patch cord connected thereto. The plug of the patch cord in a LAN network is usually an RJ-45 connector. The TIA standard requires both the RJ-45 plugs connected to the test instrument and the remote test unit, respectively, to be excluded from the cross-talk measurement. Therefore, the cross-talk measurement of the channel configuration 1 should include cross-talk defined along a cable channel 2 from the portion of the patch cord at the near-end RJ-45 connector to the portion of the patch cord at the far-end RJ-45 connector. However, as described earlier, when the test instrument measures the cross-talk of the channel configuration 1, the result of the cross-talk measurement contains the cross-talk effects from the near end RJ-45 plug. Furthermore, the result of the cross-talk measurement also includes effects due to the impedance of the adapter and of the test instrument.

The embodiments of the invention provide a method for automatically compensating for near-end cross-talk in the raw cross-talk signal obtained by the test instrument. Consequently, the compensated cross-talk signal contains only the cross-talk from the cable channel 2, in compliance with the TIA standard.

To determine the near-end cross-talk, the test instrument injects a test signal into a twisted pair of conductors in the LAN cable. The test signal is a semi-periodic signal, for example a sinusoidal signal, having a frequency sweep across a band of frequencies. The frequency of the test signal is swept between 1 megahertz and 350 megahertz, for example starting from 1 megahertz increasing to 350 megahertz, each time by a sweep frequency step depending on the sweep frequency. For example, the sweep frequency step may be 0.125 MHz, 0.25 MHz and 0.5 MHz for increasing sweep frequency in the range of 1–32 MHz, 32–100 MHz and 100–350 MHz respectively. The injected test signal in the twisted pair of conductors induces a cross-talk signal in response to the frequency sweep in another twisted pair of conductors in the same LAN cable. The induced cross-talk signal in the other twisted pair of conductors is received by the test instrument as the full or complete raw cross-talk signal. This complete raw cross-talk signal is made up of discrete magnitude values, each of which corresponds to a sweep frequency of the test signal. The complete raw cross-talk signal includes cross-talk components (not shown) corresponding to the near end RJ-45 plug, the adapter and the test instrument and cross-talk sources at different distances from the test instrument. Due to the different sweep frequency steps mentioned above, there are different numbers of discrete magnitude values for each 1

MHz change in the sweep frequency. There are eight, four and two magnitude values for each 1 MHz change in sweep frequency in the range of 1–32 MHz, 32–100 MHz and 100–350 MHz respectively. The test instrument preprocesses this complete raw cross-talk signal to obtain a subset raw cross-talk signal corresponding to test signal frequencies at Δf intervals, such as 1 MHz intervals. This subset raw cross-talk signal therefore includes one in every eight values of the complete raw cross-talk signal corresponding to the test signal frequency range of 1–32 MHz. Similarly, the subset raw cross-talk signal includes one in every four and one in every two values of the complete raw cross-talk signal corresponding to the test signal frequency ranges of 32–100 MHz and 100–350 MHz respectively. The subset raw cross-talk signal therefore has a lesser number of values than the complete raw cross-talk signal. The subset raw cross signal values are also evenly spaced apart at Δf intervals. For ease of description, the subset raw cross-talk signal is referred to hereafter as simply the raw cross-talk signal. The test instrument processes the raw cross-talk signal in the frequency domain to represent it in the form of a complex quantity which is defined as:

$$X(n)=X_{re}(n)+j \cdot X_{im}(n)$$

wherein $X(n)$ is the raw cross-talk signal value at a given frequency $n\Delta f$, $X_{re}(n)$ is the real part of $X(n)$, and $X_{im}(n)$ is the imaginary part of $X(n)$.

The values of a raw cross-talk signal $X(n)$, with respect to sweep frequency, vary according to the distance of each of the cross-talk sources from a test signal source in the test instrument, and the impedance of each of the cross-talk sources.

The propagation delay associated with a particular cross-talk source increases with an increase in the electrical distance of the cross-talk source from the test signal source. The propagation delay affects how the value of a cross-talk component, which corresponds to the cross-talk source, vary over the sweep frequency range.

Fourier analysis shows that when the propagation delay associated with the cross-talk source is long, the value of the cross-talk component has a high frequency periodic variation over the sweep frequency range. Similarly, when the propagation delay associated with the cross-talk source is short, the value of the cross-talk component has a low frequency periodic variation over the sweep frequency range. In the extreme case when the source of the cross-talk is at the test signal source, the variation of the value of the cross-talk component is non-periodic over the sweep frequency range, in other words, the variation of the value of the cross-talk component does not result in a complete cycle within the sweep frequency range.

The impedance of the cross-talk source is the other factor that affects the variation of the value of the cross-talk component over the sweep frequency range The reactive nature of the cross-talk impedance of the cross-talk source causes the corresponding cross-talk component to be dependent on the sweep frequency. The cross-talk component of a cross-talk source close to the test signal source exhibits non-periodic variation of values over the sweep frequency range.

Based on the knowledge of the electrical distance of the cross-talk source from the test signal source, and the characteristics of a cross-talk component produced by that cross-talk source (or more specifically the impedance of the cross-talk source), it is possible to determine the cross-talk effects from that particular cross-talk source, and, in the case of near-end cross-talk, compensate for such near-end cross-talk from the raw cross-talk signal $X(n)$.

Figure 2:
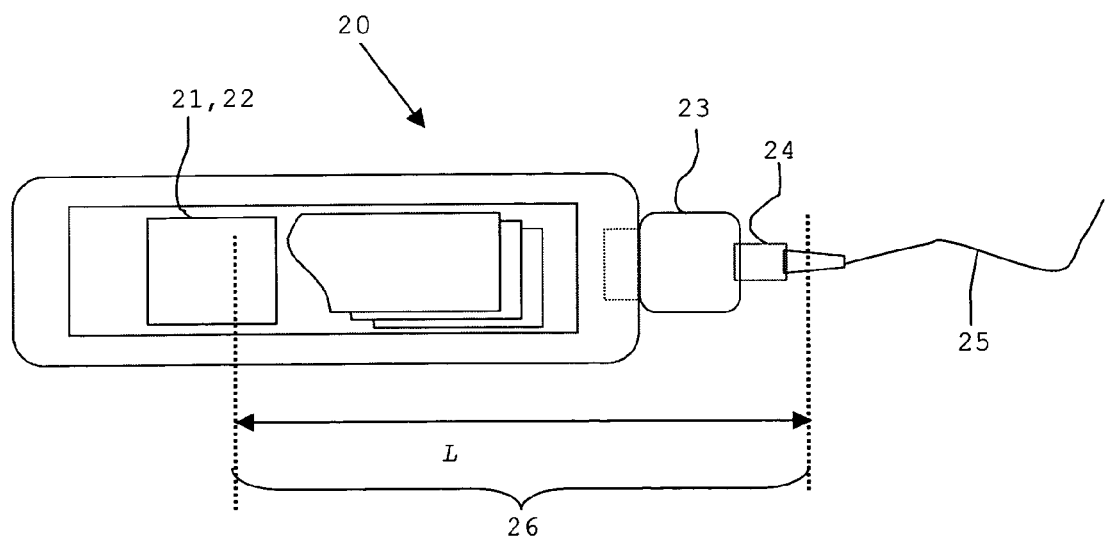
FIG. 2 is a drawing of a test instrument for measuring cross-talk of the cable channel in FIG. 1.

With reference to FIG. 2, a test instrument 20 for measuring cross-talk of the channel configuration 1 is shown. The test instrument 20 has a test signal source 21 and a cross-talk signal receiver 22 in the same unit. The test signal source 21 generates the test signal to be input or injected into the channel configuration 1 in a LAN cable 25. The cross-talk signal receiver 22 receives the raw cross-talk signal induced by the test signal from another twisted pair of conductors in the LAN cable 25. The test instrument 20 has an adapter 23 that receives the RJ-45 connector 24 of the LAN cable 25.

The raw cross-talk signal received by the cross-talk signal receiver 22 includes both cross-talk generated by cross-talk sources from the cable channel 2 of the channel configuration 1 and the undesired cross-talk effects from a near-end region 26 extending from the test signal source 21 to the RJ-45 connector 24. Therefore, the undesired cross-talk effects from the near-end region 26, or simply the near end cross-talk signal, should be determined and removed from the raw cross-talk signal in order to obtain a cross-talk measurement of the cable channel 2 only. The near-end region 26 is also represented within a distance L from the test signal source 21. In this case, the test instrument 20 needs to determine the near end cross-talk signal generated within the distance L from the test signal source 21.

As the distance L is very small, the near end cross-talk signal induced within the distance L from the test signal source 21 is the sum of non-periodic cross-talk components and low frequency cross-talk components of the raw cross-talk signal. Based on this fact, the near-end cross-talk signal can be determined by obtaining cross-talk components of the raw cross-talk signal that meet at least one of the following two criteria:

The cross-talk component is non-periodic over the sweep frequency range, i.e. in the above embodiment 1 MHz to 350 MHz, and The cross-talk component is periodic having a repetition period of equal to or more than a predefined number of sweep frequency steps. In the above embodiment, this predefined number of sweep frequency steps, which corresponds to a propagation delay of 8 nsec or shorter, is determined to be 125 sweep frequency steps of 1 MHz each. How this 8 nsec propagation delay is obtained will be described later.

Figure 12:
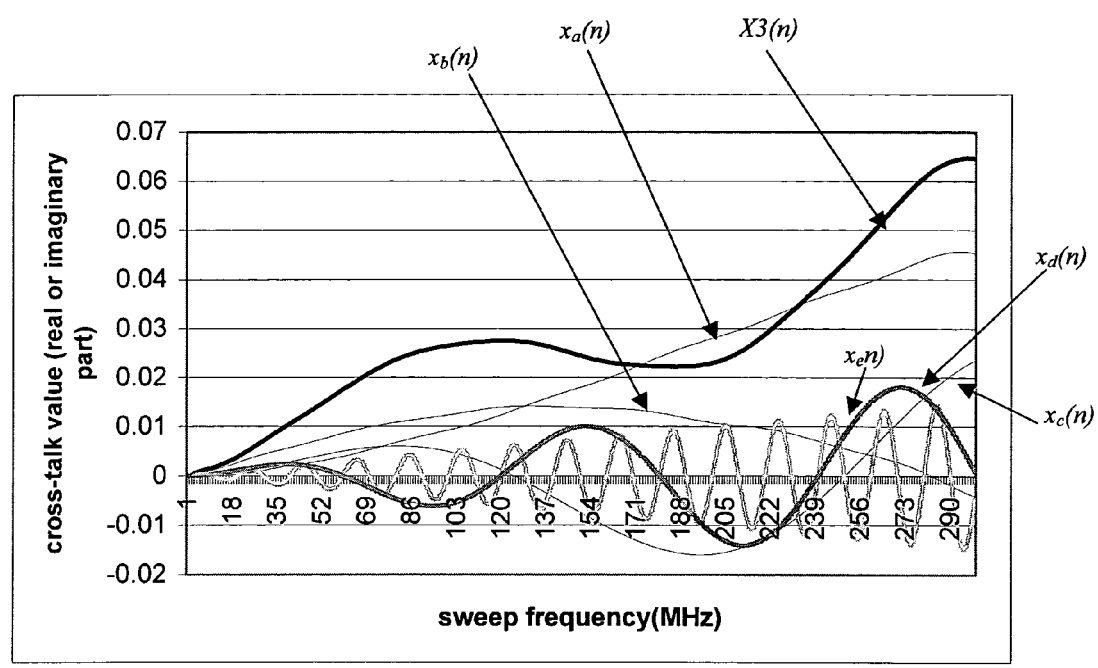
FIG. 12 is a graphical representation of a number of cross-talk components of the raw cross-talk signal in FIG. 4, some of which constitute the near end cross-talk signal in FIG. 6.

The cross-talk components of the raw cross-talk signal that meet the above criteria are referred to as near end cross-talk components, which when combined define or constitute the near end cross-talk signal. FIG. 12 illustrates a number of cross-talk components, $x_a(n)$, $x_b(n)$, $x_c(n)$, $x_d(n)$ and $x_e(n)$ of the raw cross-talk signal. According to the criteria described above, the cross-talk components $x_a(n)$, $x_b(n)$ and $x_c(n)$ are considered to be near end cross-talk components while the cross-talk components $x_d(n)$ and $x_e(n)$ are not. The cross-talk components $x_a(n)$ and $x_b(n)$ are considered to be non-periodic as they do not form one complete cycle within the sweep frequency range. These cross-talk components are thus near end cross-talk components. The cross-talk component $x_c(n)$ forms one complete cycle within the sweep frequency range and is thus considered as periodic and not meeting the first of the two criteria described above. However, the period of the cross-talk component $x_c(n)$ is about 250 sweep frequency steps long.

Such a period is more than the predefined 125 sweep frequency steps. Consequently, the cross-talk component $x_c(n)$ is also considered to be a near end cross-talk component. The cross-talk components $x_d(n)$ and $x_e(n)$ are both periodic and have a period of 120 and 23 sweep frequency steps respectively, both of which are less than the predefined 125 sweep frequency steps. Therefore, these cross-talk components $x_d(n)$ and $x_e(n)$ are not near end cross-talk components and do not constitute the near end cross-talk signal. The near end cross-talk signal, which is a combination of the near end cross-talk components, is subtracted from the raw crosstalk signal X(n) to generate the cross-talk measurement of the cable channel 2.

The near end cross-talk signal can be determined by a digital filtering technique or an averaging technique. However, the invention is not limited to using only these two techniques. Any other techniques suitable to determine the near end cross-talk signal may be used.

Figure 3:
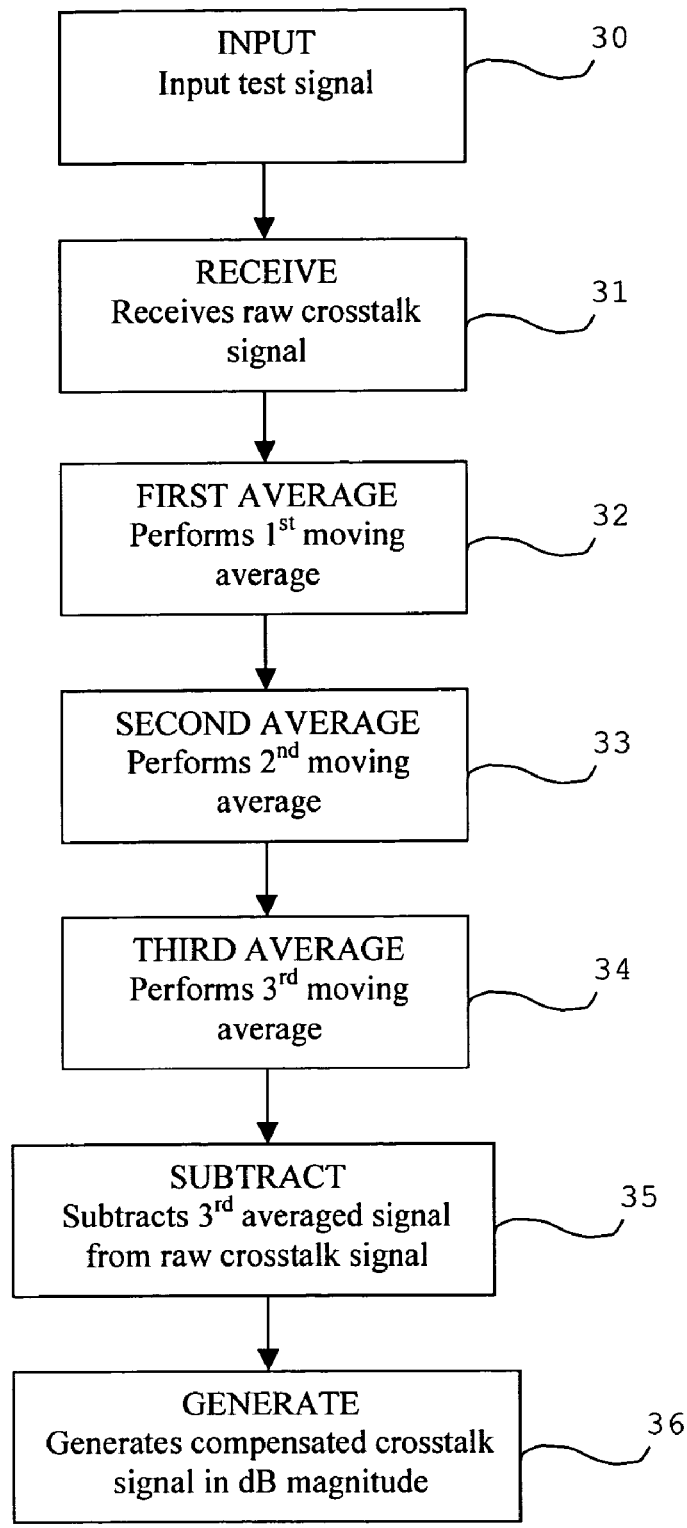
FIG. 3 is a flow chart of a method for determining and removing undesired cross-talk effects using a moving average based filtering technique on a raw crosstalk signal induced by a test signal having a frequency that is swept between 1 MHz and 350 MHz.

With reference to FIG. 3, a flow chart of the averaging technique for determining and removing the near end cross talk signal from the raw cross-talk signal is illustrated. In INPUT step 30, the test signal source 21 of the test instrument 20 inputs the test signal into a twisted pair of conductors of the cable channel 2 in the LAN cable 25. The test signal induces cross-talk in another twisted pair of conductors of the LAN cable 25. In RECEIVE step 31, the cross-talk signal receiver 22 receives the complete raw cross-talk signal from the other twisted pair of conductors. The received complete raw cross-talk signal is preprocessed, as described above, to obtain the subset raw cross-talk signal which is represented as a complex quantity X(n) having a real part $X_{re}(n)$ and an imaginary part $X_{im}(n)$ in the frequency domain.

In FIRST AVERAGE step 32, a processing unit of the test instrument 20 performs a first moving average operation on the raw cross-talk signal X(n) to generate a first averaged cross-talk signal. In this embodiment there are 350 discrete sweep frequencies in the sweep frequency range. At each sweep frequency value, an averaged raw cross-talk signal value corresponding to the sweep frequency (for both the real part $X_{re}(n)$ and the imaginary part $X_{im}(n)$ of X(n)) is obtained by averaging discrete raw cross-talk signal values, or simply magnitude values, occurring in a window that spans either side of the raw cross-talk signal value X(n) corresponding to the sweep frequency nΔf. The number of discrete magnitude values in the window on either side of the raw cross-talk signal value X(n) may include but not limited to one hundred values. Such a moving average is referred to as a 100-point moving average. The first moving average is performed separately on both the real part $X_{re}(n)$ and the imaginary part $X_{im}(n)$ of the raw cross-talk signal X(n) for each raw cross-talk signal corresponding to each sweep frequency. The first moving average is defined by the following equation:

$$X1(n) = \frac{1}{2K1+1} \sum_{m=-K1}^{m=K1} X(m+n)$$

wherein
X1(n) is the first averaged cross-talk signal value at a sweep frequency nΔf,
X(n) is the raw cross-talk signal value at a sweep frequency nΔf,
Δf is the predefined sweep frequency step, K1 is a positive integer, which corresponds to about half the number of discrete magnitude values for performing the first moving average,
m is an integer from −K1 to K1, and
n is a positive integer, In the FIRST AVERAGE step 32, $$K1 = \begin{cases} 50, & n >= 50 \\ n, & n < 50 \end{cases}$$

Figure 4:
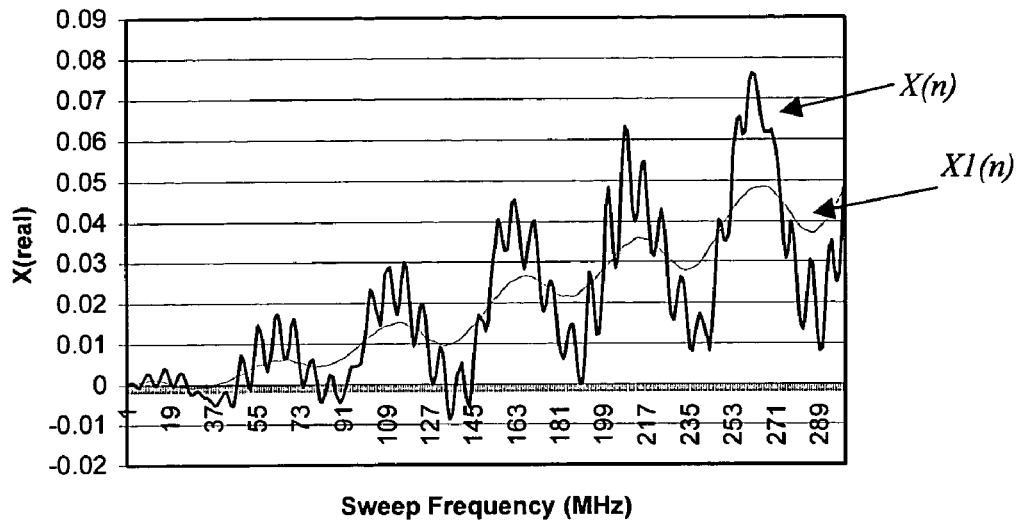
FIG. 4 is a graphical representation of the real part of the raw cross-talk signal and a first averaged cross-talk signal determined from a FIRST AVERAGE step in FIG. 3.

With reference to FIG. 4, a graphical representation of the real part of the raw cross-talk signal X(n) and the first averaged cross-talk signal X1(n) with respect to the sweep frequency is shown.

In SECOND AVERAGE step 33 as shown in FIG. 3, the processing unit performs a second 100-point moving average operation on the first averaged cross-talk signal X1(n), i.e. an averaged cross-talk signal obtained in a preceding moving average operation, to generate a second averaged cross-talk signal X2(n). The second moving average is defined by the following equation:

$$X2(n) = \frac{1}{2K2+1} \sum_{m=-K2}^{m=K2} X1(m+n)$$

wherein
X2(n) is the second averaged cross-talk signal at a sweep frequency nΔf,
X1(n) is the first averaged cross-talk signal at a sweep frequency nΔf,
Δf is the predefined sweep frequency step,
K2 is a positive integer, which corresponds to about half the number of discrete magnitude values for performing the second moving average,
m is an integer from −K2 to K2, and
n is a positive integer, In the SECOND AVERAGE step 33, $$K2 = \begin{cases} 50, & n >= 50 \\ n, & n < 50 \end{cases}$$

Figure 5:
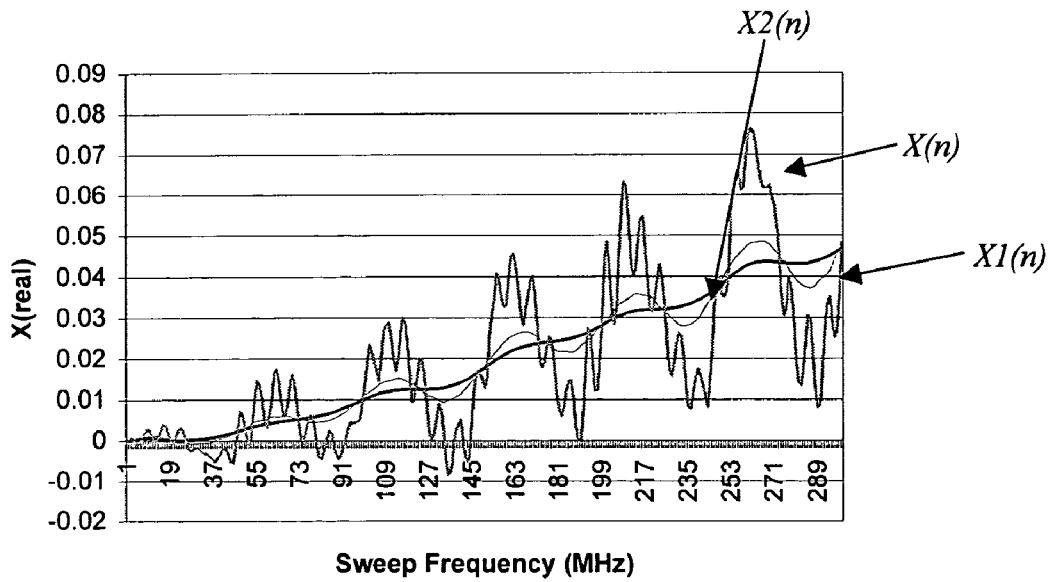
FIG. 5 is a graphical representation of the real part of the raw cross-talk signal, the first averaged cross-talk signal and a second averaged cross-talk signal determined from a SECOND AVERAGE step in FIG. 3.

With reference to FIG. 5, a graphical representation of the real part of the raw cross-talk signal X(n), the first averaged cross-talk signal X1(n) and the second averaged cross-talk signal X2(n) with respect to the sweep frequency is shown.

In THIRD AVERAGE step 34 as shown in FIG. 3, the processing unit performs a third moving average operation on the second averaged cross-talk signal X2(n), i.e. an averaged cross-talk signal obtained in a preceding moving average operation, to generate a third averaged cross-talk signal X3(n). In the THIRD AVERAGE step 34, a 200-point moving average is used. The third moving average is defined by the following equation:

$$X3(n) = \frac{1}{2K3+1} \sum_{m=-K3}^{m=K3} X2(m+n)$$

wherein

X3(n) is the third averaged cross-talk signal at a sweep frequency nΔf,

X2(n) is the second averaged cross-talk signal at a sweep frequency nΔf,

Δf is the predefined sweep frequency step,

K3 is a positive integer, which corresponds to about half the number of discrete magnitude values for performing the third moving average, m is an integer from −K3 to K3, and n is a positive integer.

In the THIRD AVERAGE step 34, $$K3 = \begin{cases} 100, & n >= 100 \\ n, & n < 100 \end{cases}$$

Figure 6:
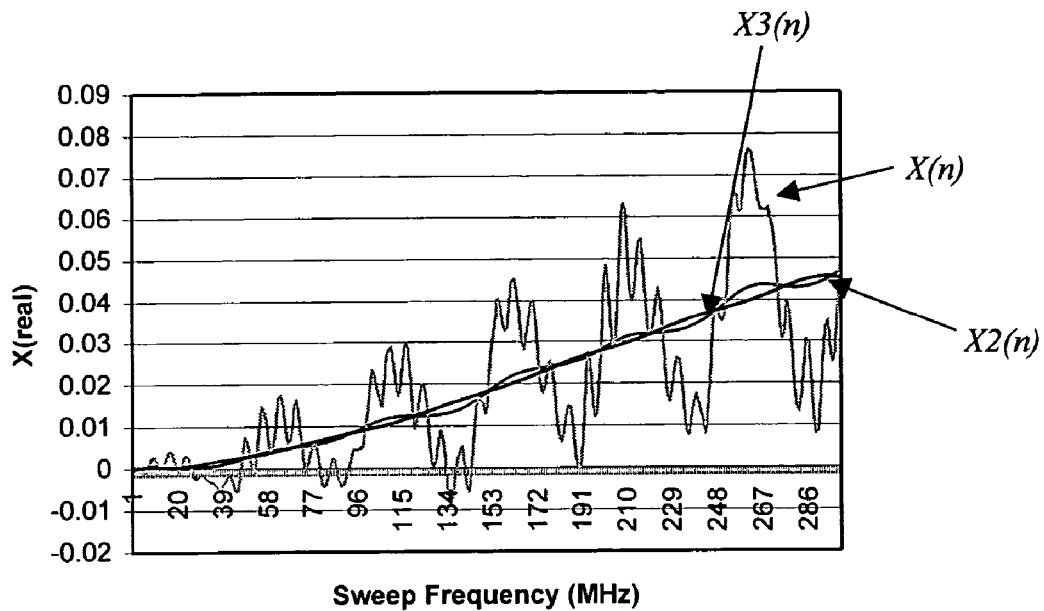
FIG. 6 is a graphical representation of the real part of the raw cross-talk signal, the second averaged cross-talk signal and a third averaged cross-talk signal determined from a THIRD AVERAGE step in FIG. 3, wherein this third averaged cross-talk signal may be deemed to correspond to a near end cross-talk signal.

With reference to FIG. 6, a graphical representation of the real part of the raw cross-talk signal X(n), the second averaged cross-talk signal X2(n) and the third averaged cross-talk signal X3(n) with respect to the sweep frequency is shown.

The third averaged cross-talk signal X3(n) corresponds to the near end cross-talk signal of the raw cross-talk signal X(n). In SUBTRACT step 35, as shown in FIG. 3, the processing unit subtracts the third averaged cross-talk signal X3(n) from the complete raw cross-talk signal X(n) to result in a compensated cross-talk signal $X_c$(n). It should be noted that since there are a lesser number of values in the third averaged cross-talk signal X3(n) than the complete raw cross-talk signal X(n) as described above, each third averaged cross-talk signal value is used more than once for subtraction from corresponding complete raw cross-talk signal values. For example, there is only a single third averaged cross-talk signal value corresponding to the sweep frequency between 6 MHz and 7 MHz while there are eight complete raw cross-talk signal values for the same sweep frequency range since the test signal frequency is increased in steps of 0.125 MHz for sweep frequencies less than 32 MHz. The single third averaged cross-talk signal value is therefore subtracted from each of the eight complete raw cross-talk signal values. The third averaged cross-talk signal value for the other complete raw cross-talk signal values may be similarly determined for subtraction therefrom.

Figure 7:
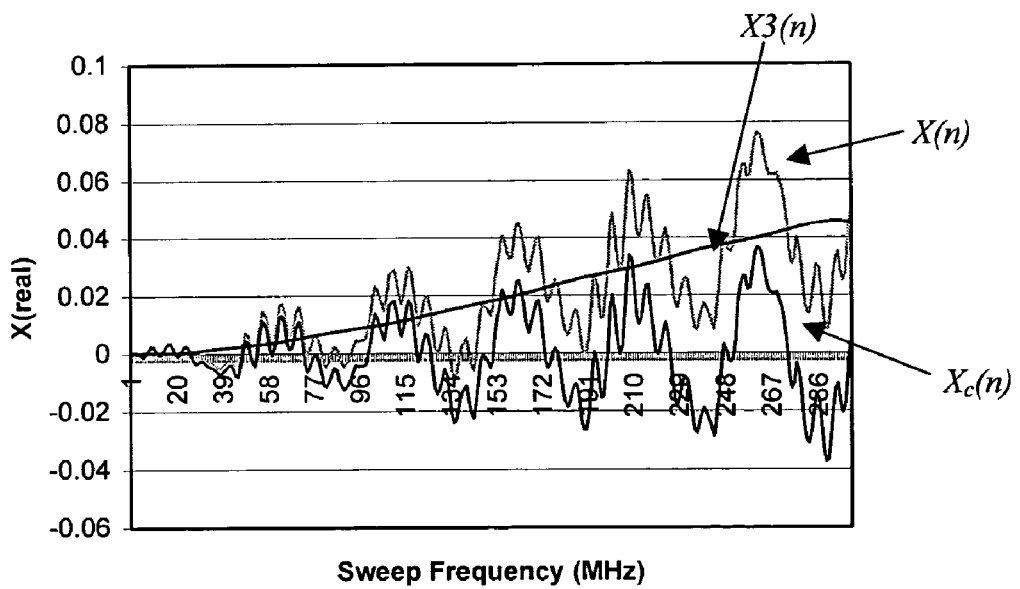
FIG. 7 is a graphical representation of the real part of the raw cross-talk signal, the third averaged cross-talk signal and a compensated cross-talk signal obtained as a result of a SUBTRACT step in FIG. 3.

With reference to FIG. 7, a graphical representation of the real part of the raw cross-talk signal X(n), the third averaged cross-talk signal X3(n) and the compensated cross-talk signal $X_c$(n) with respect to the sweep frequency is shown. The compensated cross-talk signal $X_c$(n) indicates the cross-talk of the channel cable 2. It excludes any near-end cross-talk effects from the RJ-45 connector 24 connected to the adapter 23 and the other effects due to the impedance in the test instrument 20 and the adapter 23.

Figure 8:
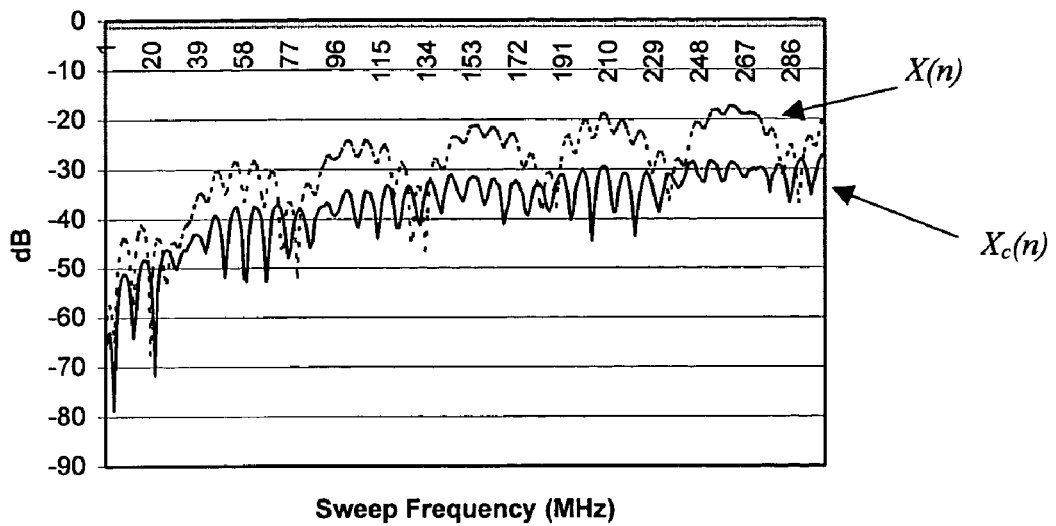
FIG. 8 is a graphical representation of the raw cross-talk signal and the compensated cross-talk signal in FIG. 7, in dB magnitude.

In GENERATE step 36 as shown in FIG. 3, the compensated cross-talk signal $X_c$(n) in decibel (dB) magnitude is generated using the following equation:

$$X_c(n), dB = 10 * \log(X_{c,re}(n)^2 + X_{c,im}(n)^2)$$

wherein $X_c$(n), dB is the compensated cross-talk signal in dB magnitude at a sweep frequency nΔf, Δf is the predefined sweep frequency step, $X_{c,re}$(n) is the real part of the compensated cross-talk signal $X_c$(n), $X_{c,im}$(n) is the imaginary part of the compensated cross-talk signal $X_c$(n), With reference to FIG. 8, a graphical comparison of the raw cross-talk signal X(n) and the compensated cross-talk signal $X_c$(n) in dB magnitude with respect to the sweep frequency is shown. The plot of the compensated cross-talk signal $X_c$(n) in dB magnitude versus frequency is used to compare with a cross-talk specification limit line provided by TIA to determine if the cable channel 2 complies with the TIA standard.

Three levels of moving average are performed in the embodiment of the invention illustrated above. In addition, the first and second levels of moving average are performed over the same number of discrete magnitude values. The third level of moving average is performed over twice the number of discrete magnitude values used in the first or second levels of moving average. The use of three levels of moving average, together with the respective number of discrete magnitude values, is able to achieve a sharp cut-off for signal delays beyond length L from the test signal source 21 of the test instrument 20. Therefore, cross-talk components corresponding to a propagation distance larger than L can be determined and removed quite effectively. Furthermore, non-periodic cross-talk components of the raw cross-talk signal X(n) can also be determined and removed quite efficiently. This large and non-periodic component may be due to the internal impedance of the test instrument 20 as a result of poor quality near end connection. Therefore, it is important to be able to compensate such large impedance of the test instrument 20.

The exact size of the moving average is determined based on the propagation delay of the signal at distance L from the test signal source 21. The moving average filter has a propagation delay response g(t), i.e. a ratio of the third averaged cross-talk signal to the raw cross-talk signal, in the time domain that is defined by:

$$g(t) = \left(\frac{\sin(K1t)}{(K1t)}\right)\left(\frac{\sin(K2t)}{(K2t)}\right)\left(\frac{\sin(K3t)}{(K3t)}\right)$$

wherein g(t) is a moving average filter response at a propagation delay t,

K1 is a positive integer, which corresponds to about half the number of discrete magnitude values for performing the first moving average, K2 is a positive integer, which corresponds to about half the number of discrete magnitude values for performing the second moving average, and K3 is a positive integer, which corresponds to about half the number of discrete magnitude values for performing the third moving average.

Figure 11:
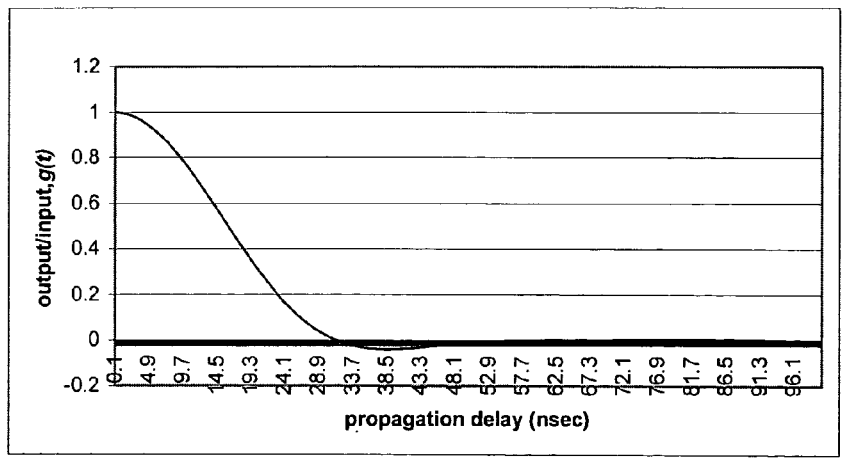
FIG. 11 is a graph showing a response curve in the time domain of the moving average based filtering technique in FIG. 3.

A method of determining the values of K1, K2 and K3 is next described. Firstly, a one-time calibration procedure is used to determine a round-trip propagation delay at the distance L from the test signal source 21. Such a calibration procedure may be carried out by connecting a calibration plug (not shown) to the adapter 23 of the test instrument 20. The calibration plug has a pair of conductors shorted at a length L from the test signal source 21. A sinusoidal signal for example at a frequency of 10 MHz is then injected into the shorted conductor pair using the test signal source 21. The shorted conductor pair is monitored at the test signal source 21 for a reflected signal. The phase difference or delay between the injected sinusoidal signal and the reflected signal allows the round-trip propagation delay to be determined. Such a propagation delay for a test instrument 20 may for example be 8 nanoseconds. For determining NEXT contributions from the test signal source 21 to a length L from the test signal source 21, a "low pass" filter is required. An ideal low-pass filter would take into account or "pass" all raw cross-talk signal values corresponding to a propagation delay of equal to or shorter than 8 nsec, while discarding or "cutting off" those corresponding to a propagation delay of longer than 8 nsec. The use of a single 200-point moving average operation, such as the third moving average operation having a $$\frac{\sin(100t)}{(100t)}$$

response, though not perfectly, at least approximately correspond to the response of the ideal filter. This third moving average operation would however undesirably "pass" some of the raw cross-talk signal values corresponding to propagation delays longer than 8 nsecs. Therefore, two other levels of moving average, i.e. the first and the second moving average operation described above, are cascaded to the third moving average operation to produce an overall filter response as shown in FIG. 11. Such a filter response, although still not a close approximation of the ideal filter, is however able to substantially remove or cutoff raw cross-talk signals corresponding to a propagation delay of 8 nsecs or longer. It is found that a 100-point moving average for the first and the second moving average operations would result in the filter response in FIG. 11, which has a 90% cutoff (i.e. g(t)= 0.9) of raw cross-talk signals corresponding to a propagation delay of 8 nsec. For a different value of length L, or a different propagation delay determined using for example the one-time calibration procedure described above, the size of the moving average operations will have to be changed accordingly. Otherwise, the NEXT contributions of the RJ-45 connector 24 may be incorrectly determined to fall outside the distance L. Similarly, the NEXT contributions of some parts of the cable channel 2 may also be incorrectly determined to be included within the distance L. For determining the sizes of moving average operations, i.e. the values of K1, K2 and K3, the cross-talk caused by impedance of a cross-talk source can be ignored.

It should however be pointed out that the invention does not restrict the method to performing only three levels of moving average on the raw cross-talk signal. In particular, two levels or more than three levels of moving average may be performed on the raw cross-talk signal to determine the near end cross-talk signal of the raw cross-talk signal. For example, the first level of moving average is performed on the raw cross-talk signal to generate the first averaged cross-talk signal in the FIRST AVERAGE step 32. Subsequently, the FIRST AVERAGE step 32 is repeated with the raw cross-talk signal substituted by the first averaged cross-talk signal, i.e. an averaged cross-talk signal obtained in a preceding moving average operation, to generate a further averaged cross-talk signal. The FIRST AVERAGE step 32 may be repeated again in the same manner for a desired number of times to generate a final averaged cross-talk signal. The final averaged cross-talk signal, which is deemed to correspond to a near end cross-talk signal, is subtracted from the raw cross-talk signal in the SUBTRACT step 35 to generate the compensated cross-talk signal.

In another embodiment, the processing unit determines the near end cross-talk signal using digital filtering techniques. In this technique, the processing unit applies an appropriate digital filter, for example a Finite Impulse Response (FIR) filter, to the raw cross-talk signal. An example of a FIR filter is represented by the equation:

$$X(n) = \sum_{m=-K}^{m=K} u(m) * y(n-m)$$

wherein
X(n) is the filtered cross-talk signal,
u(m) is the filter coefficient,
y(n−m) is the raw cross-talk signal,
K is about half the total number of taps, and
m is an integer between −K and K.

Figure 9:
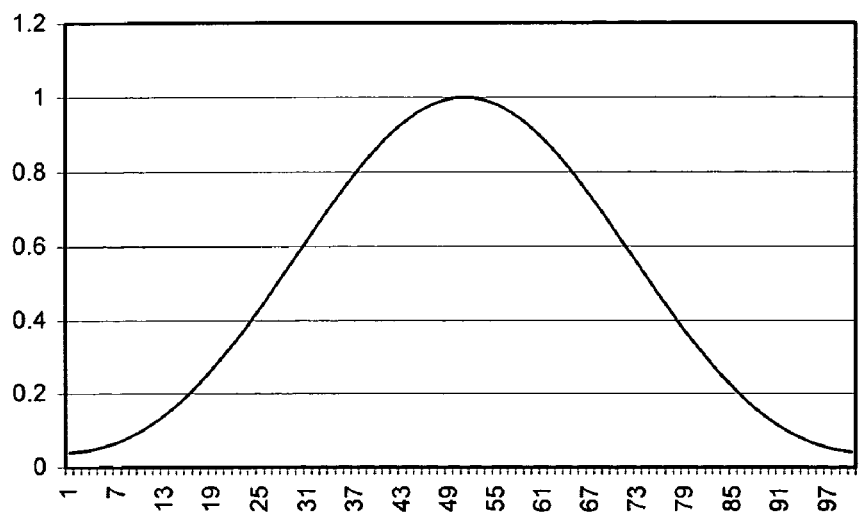
FIG. 9 is a plot of the response of a 101-point raised cosine FIR digital filter used to determine the undesired crosstalk effects in another embodiment.

With reference to FIG. 9, a plot of the response of a 101-point raised cosine FIR digital filter designed to achieve a cut-off at distance L is shown. It can be seen from FIG. 9 and the above equation that the moving average of length 2K+1 is a special case of the digital filtering technique using the FIR filter with all coefficients having the value of 1/(2K+1). A convolution of the raw cross-talk signal with the digital filter in the frequency domain thus produces a filtered cross-talk signal X(n) which is similar to the averaged cross-talk signal in the previous embodiment.

The test instrument 20 for providing near-end cross-talk compensation according to the invention includes a sweep generator, a phase locked loop based RF receiver, an analog to digital converter (ADC), a microprocessor and an adapter. The sweep generator is the test signal source 21 for generating the test signal. The phase locked loop based RF receiver is the cross-talk signal receiver 22, which is able to detect the phase and periodic variations of the value of the raw cross-talk signal. The ADC digitizes the raw cross-talk signal into a format suitable to be processed by the processing unit. The processing unit may be a high end microprocessor with memory unit and clock unit for controlling the processes executing the method according to the invention. The adapter 23 acts as an interface connector for the LAN cable 25 to be connected to the test instrument 25. In another embodiment, the test instrument 20 has a user interface which allows a user to control the usage of the test instrument 20 and also to display the results of the compensated cross-talk measurement.

The test instrument only compensates the near-end cross-talk contributed by the near-end RJ-45 connector and the near-end test instrument. It does not compensate for the cross-talk effects of the far-end RJ-45 connector. The remote test unit (not shown) which is connected to the cable channel 2 at the far end may compensate the far-end effects (which are the near-end effects relative to the remote test unit) by removing such effects according to the invention.

Figure 10:
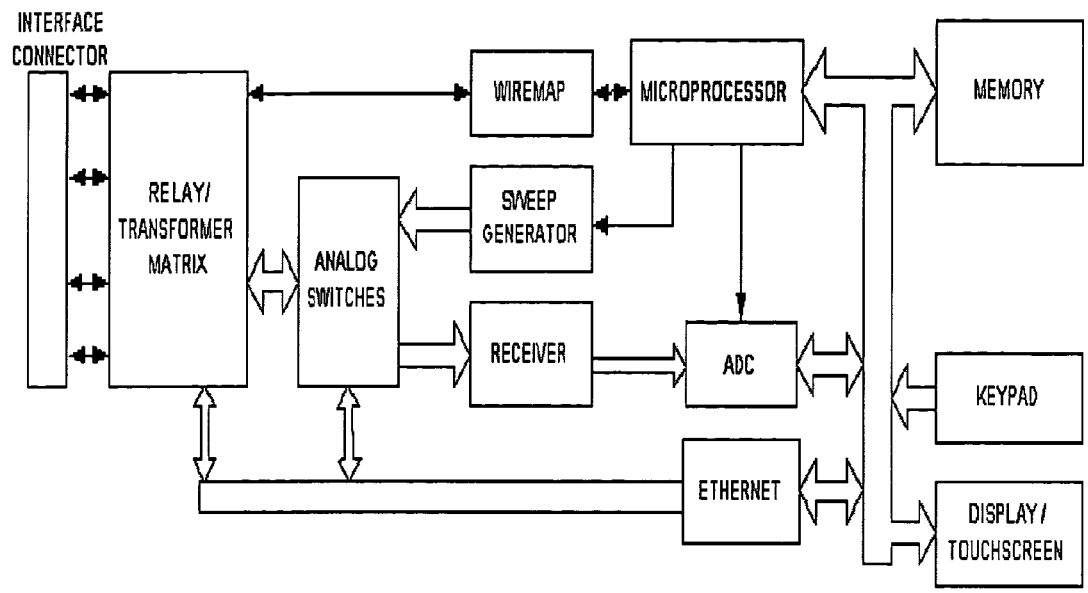
FIG. 10 is a block diagram of the test instrument in FIG. 2 for measuring crosstalk of the cable channel.

With reference to FIG. 10, a typical system diagram of the test instrument 20 is shown. The method according to the invention can be implemented as a computer program or firmware in the memory unit of the test instrument. The program implementing the invention controls the microprocessor to execute the steps required to provide the near-end cross-talk compensation due to the RJ-45 connector 24 and the near-end impedance of the test instrument 20 and the adapter 23. The system may be implemented in a portable testing instrument, such as a hand held testing instrument.

It should be noted that providing compensated near-end cross-talk according to the invention is implemented in the frequency domain. Therefore, it is low in computational complexity and can be advantageously implemented in portable test instruments for measuring cross-talk of LAN cable channels.

We claim:

1. A method for determining near-end cross-talk effects, the method comprising:
   inputting a test signal into at least one conductor of a transmission cable;
   receiving a raw cross-talk signal from at least another conductor of the transmission cable; and
   processing the raw cross-talk signal in the frequency domain to determine a combination of near-end cross-talk components thereof, said combination of components being characteristic of the near-end cross-talk effects,
wherein the test signal has a frequency that is swept, each time by a predefined sweep frequency step, across a predetermined sweep frequency range, and wherein the near end cross-talk components are cross-talk components of the raw cross-talk signal that are non-periodic over the sweep frequency range or periodic having a repetition period of more than a predetermined number of sweep frequency steps.

2. A method for determining near-end cross-talk effects according to claim 1, wherein the combination of near end cross-talk components are obtained by averaging the raw cross-talk signal.

3. A method for determining near-end cross-talk effects according to claim 2, wherein the averaging of the raw cross-talk signal is performed using the function $$X1(n) = \frac{1}{2K+1} \sum_{m=-K}^{m=K} X(m+n)$$

wherein
   $X1(n)$ is the averaged cross-talk signal value at a sweep frequency $n\Delta f$,
   $X(n)$ is the raw cross-talk signal value at a sweep frequency $n\Delta f$,
   $\Delta f$ is the predefined sweep frequency step,
   K is a positive integer, which corresponds to about half a predetermined number of discrete magnitude values for performing the moving average,
   m is an integer from –K to K, and
   n is a positive integer.

4. A method for determining near-end cross-talk effects according to claim 2, wherein the averaging of the raw cross-talk signal comprises:
   a) performing a moving average operation over a predetermined number of discrete magnitude values of the raw cross-talk signal to obtain an averaged cross-talk signal; and
   b) repeating a) on the average cross-talk signal obtained from a preceding moving average operation for a predefined number of times to obtain the combination of near end cross-talk components that is characteristic of the near-end cross-talk effects.

5. A method for determining near-end cross-talk effects according to claim 2, wherein the averaging of the raw cross-talk signal comprises:
   a) performing a first moving average operation over a predetermined number of discrete magnitude values of the raw cross-talk signal to obtain a first averaged cross-talk signal;
   b) performing a second moving average operation over the predetermined number of discrete magnitude values of the first averaged cross-talk signal to obtain a second averaged cross-talk signal; and
   c) performing a third moving average operation over twice the predetermined number of discrete magnitude values of the second averaged cross-talk signal to obtain the combination of near end cross-talk components that is characteristic of the near-end cross-talk effects.

6. A method for determining near-end cross-talk effects according to claim 1, wherein the test signal has a frequency that is swept between 1 megahertz and 350 megahertz.

7. A method for removing near-end cross-talk effects from a raw cross-talk signal, the method comprising:
   inputting a test signal into at least one conductor of a transmission cable;
   receiving the raw cross-talk signal from at least another conductor of the transmission cable;
   processing the raw cross-talk signal in the frequency domain to determine a combination of near-end cross-talk components thereof, said combination of components being characteristic of the near-end cross-talk effects; and
   subtracting the combination of near-end cross-talk components from the raw cross-talk signal to remove the near-end cross-talk effects,
wherein the test signal has a frequency that is swept, each time by a predefined sweep frequency step, across a predetermined sweep frequency range, and
wherein the near end cross-talk components are cross-talk components of the raw cross-talk signal that are non-periodic over the sweep frequency range or periodic having a repetition period of more than a predetermined number of sweep frequency steps.

8. A system for determining near-end cross-talk effects originating from a near-end location of the system, a near end portion of the system being connectable to a transmission cable comprising a plurality of conductors, the system comprising:
   an injecting unit being adapted to generate and input a test signal into at least one conductor of the transmission cable;
   a receiving unit being adapted to receive a raw cross-talk signal from at least another conductor of the transmission cable; and
   a processing unit being adapted to process the raw cross-talk signal in the frequency domain to determine a combination of near-end cross-talk components thereof, said combination of components being characteristic of the near-end cross-talk effects,
wherein the test signal has a frequency that is swept, each time by a predefined sweep frequency step, across a predetermined sweep frequency range, and wherein the near end cross-talk components are cross-talk components of the raw cross-talk signal that are non-periodic over the sweep frequency range or periodic having a repetition period of more than a predetermined number of sweep frequency steps.

9. A system for determining near-end cross-talk effects according to claim 8, wherein the processing unit is adapted to obtain the combination of near end cross-talk components by averaging the raw cross-talk signal.

10. A system for determining near-end cross-talk effects according to claim 9, wherein the processing unit is adapted to average the raw cross-talk signal by using the function $$X1(n) = \frac{1}{2K+1} \sum_{m=-K}^{m=K} X(m+n)$$

wherein
- X1(n) is the averaged cross-talk signal value at a sweep frequency nΔf,
- X(n) is the raw cross-talk signal value at a sweep frequency nΔf,
- Δf is the predefined sweep frequency step,
- K is a positive integer, which corresponds to about half predetermined number of discrete magnitude values for performing the moving average,
- m is an integer from −K to K, and
- n is a positive integer.

11. A system for determining near-end cross-talk effects according to claim 9, wherein the processing unit is adapted to average the raw cross-talk signal by:
 a) performing a moving average operation over a predetermined number of discrete magnitude values on the raw cross-talk signal to obtain an averaged cross-talk signal; and
 b) repeating a) on the average cross-talk signal obtained from a preceding moving average operation for a predefined number of times to obtain the combination of near end cross-talk components that is characteristic of the near-end cross-talk effects.

12. A system for determining near-end cross-talk effects according to claim 9, wherein the processing unit is adapted to average the raw cross-talk signal by:
 a) performing a first moving average operation over a predetermined number of discrete magnitude values of the raw cross-talk signal to obtain a first averaged cross-talk signal;
 b) performing a second moving average operation over the predetermined number of discrete magnitude values of the first averaged cross-talk signal to obtain a second averaged cross-talk signal; and
 c) performing a third moving average operation over twice the predetermined number of discrete magnitude values of the second averaged cross-talk signal to obtain the combination of near end cross-talk components that is characteristic of the near-end cross-talk effects.

13. A system for determining near-end cross-talk effects according to claim 8, wherein the test signal has a frequency that is swept between 1 megahertz and 350 megahertz.

14. A system for determining near-end cross-talk effects according to claim 8, wherein the receiving unit is a phase locked loop receiver.

15. A system for determining near-end cross-talk effects according to claim 8, wherein the processing unit is a microprocessor.

16. A system for determining near-end cross-talk effects according to claim 8, the system further comprises an analog to digital converting unit being adapted to digitize the raw cross-talk signal received by the receiving unit.

17. A system for determining near-end cross-talk effects according to claim 8, wherein the system is implemented in a portable testing instrument.

18. A system for determining near-end cross-talk effects according to claim 8, wherein the portable testing instrument comprises a hand held testing instrument.

* * * * *